Dec. 23, 1924.
E. LE G. BEERS
MOTOR VEHICLE FUEL INTAKE VALVE
Filed Nov. 19, 1923   2 Sheets-Sheet 1
1,520,103
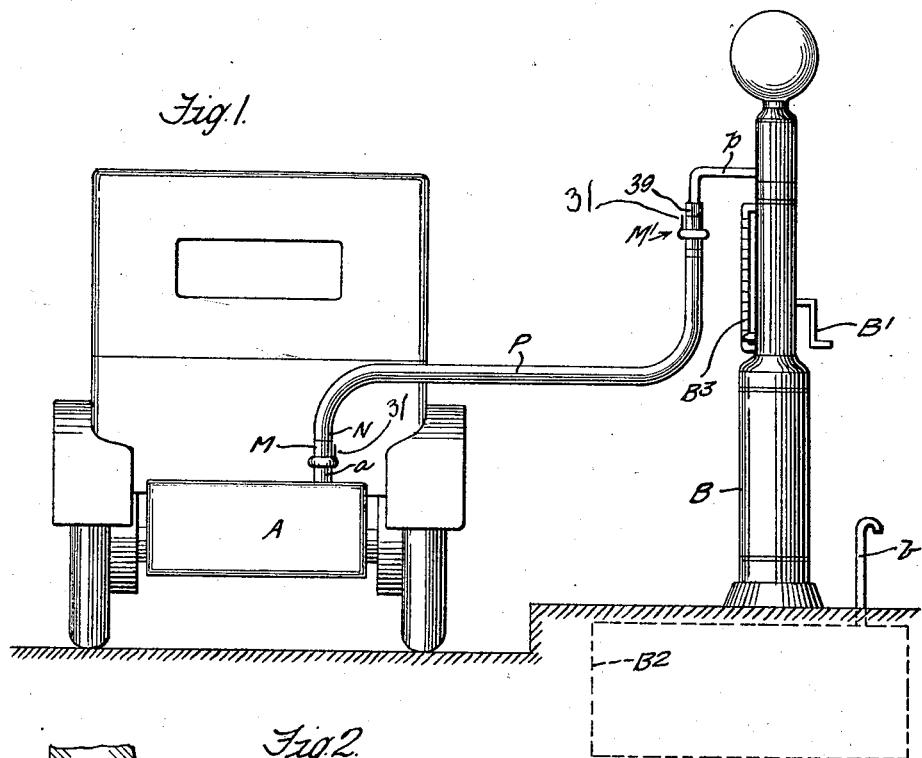
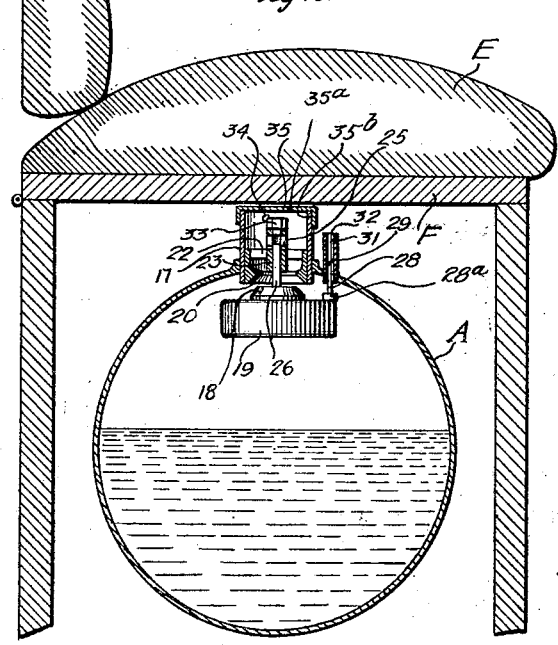
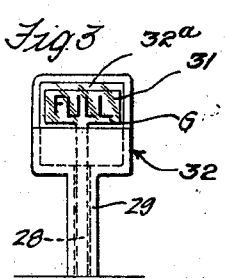
INVENTOR
EDWIN LE GRAND BEERS
BY S. Beach
ATTORNEY Dec. 23, 1924.  1,520,103
E. LE G. BEERS
MOTOR VEHICLE FUEL INTAKE VALVE
Filed Nov. 19, 1923   2 Sheets-Sheet 2
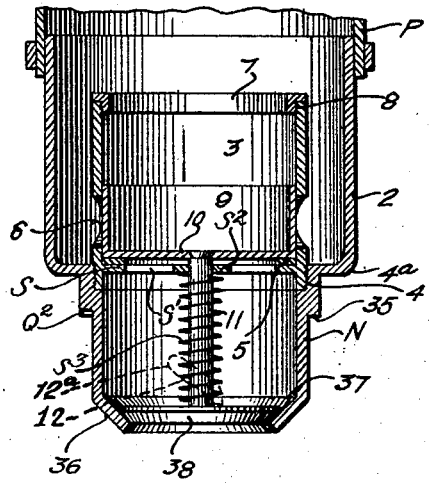
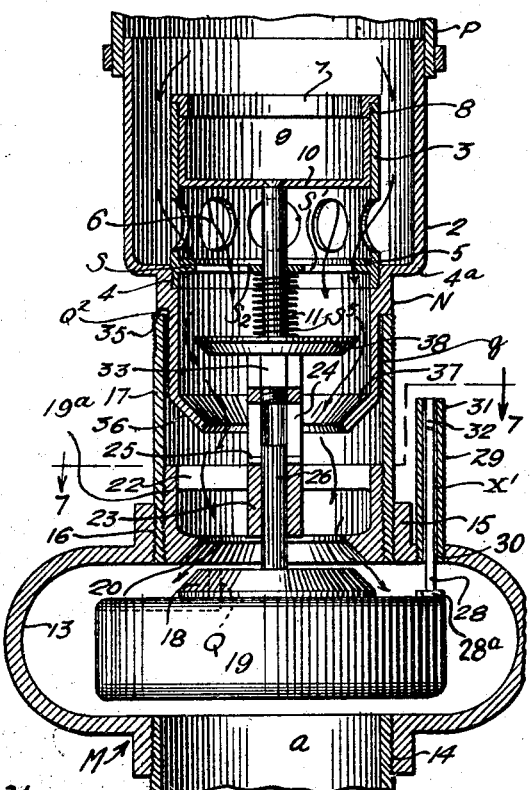
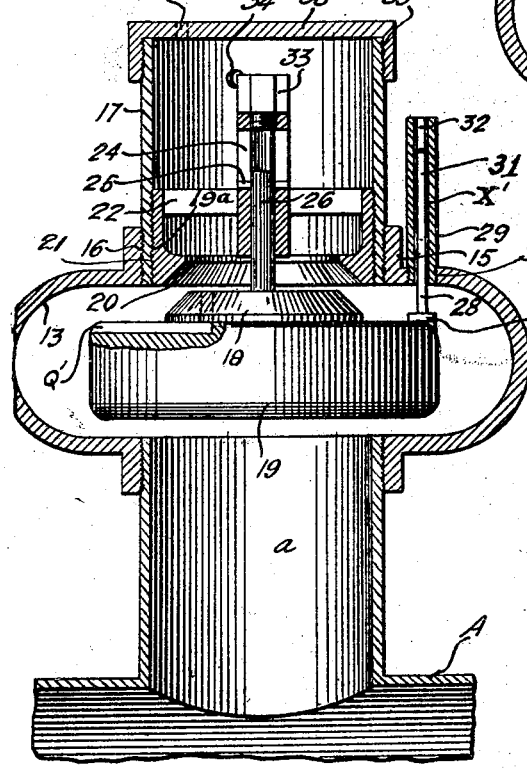
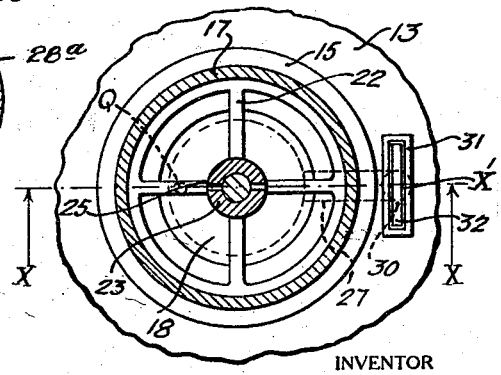
INVENTOR
EDWIN LE GRAND BEERS.
BY
Edward S. Beach
ATTORNEY Patented Dec. 23, 1924.

1,520,103

UNITED STATES PATENT OFFICE.

EDWIN LE GRAND BEERS, OF BROADALBIN, NEW YORK.

MOTOR-VEHICLE FUEL-INTAKE VALVE.

Application filed November 19, 1923. Serial No. 675,785.

*To all whom it may concern:*

Be it known that I, EDWIN LE GRAND BEERS, a citizen of the United States, and resident of Broadalbin, in the county of Fulton and State of New York, have invented certain new and useful Improvements in Motor-Vehicle Fuel-Intake Valves, of which the following is a specification.

This invention relates to motor vehicle fuel tank intake valves which may be, as shown, constructed with a signal exposed when the tank is filled.

The objects of the invention are to prevent waste of liquid fuel, convenience in filling the tanks whether they are exposed as at the rear of motor cars or under the seats thereof, and to prevent wetting down of surfaces with overflowing liquid fuel.

In the accompanying drawings forming a part hereof and illustrating the invention in the best form now known to me.

Fig. 1 is an elevational view of a roadside pump and tank installation in pipe connection with a motor car fuel tank exposed at the rear of the car.

Fig. 2 is a transverse sectional view through a seat and supporting structure under which the fuel tank is located, the tank being provided with one form of my new intake signalling valve.

Fig. 3 is a side view of the signal in exposed position and of its casing.

Fig. 4 is a vertical, sectional view of a delivery nozzle of the pipe shown in Fig. 1.

Fig. 5 is a vertical, sectional view of that form of intake signalling valve which is shown on the exposed tank in Fig. 1.

Fig. 6 is a vertical, sectional view showing the coupled delivery nozzle and intake valve as illustrated in side elevation in Fig. 1.

Fig. 7 is a transverse sectional view at line 7—7 of Fig. 6.

Features of the described invention not claimed herein form the subject matter of my application Serial No. 675,784, filed November 19, 1924.

In said application the nozzle construction shown in the accompanying drawings is claimed and not claimed herein.

In the illustrated form of the invention, A illustrates the usual gasoline or liquid fuel tank of a motor vehicle, the tank having an upstanding intake tube $a$ which is ordinarily, in existing structures, covered by a screw cap. Such tanks are closed to the atmosphere except when the caps are removed for filling, the vapor or air in the tank flowing out through the intake tube as the liquid flows through the intake tube into the tank. B illustrates one of the several types of gasoline supply pumps provided with an operating crank handle B', connected with an underground supply tank $B^2$, the latter having a vent pipe $b$ exposed to the atmosphere. The pump has a visible, calibrated indicator $B^3$, of the quantity of liquid pumped. P indicates a pipe, usually flexible, for connecting the eduction side of the pump with a delivery nozzle at the free end of the pipe, the nozzle being inserted in the intake end of the intake tube $a$ when the motor vehicle tank is to be filled.

By the present invention, in the form now illustrated, the intake port of a motor vehicle, liquid fuel tank, or of any other tank to be filled from the pipe P is provided with an intake signalling valve M; the delivery end of the pipe P is provided with a valved nozzle N; and the intake end of the pipe P is preferably attached to a signalling valve M' adjacent and in communication with the eduction port of the pump, when and if the pipe is used in connection with a pump. In some installations, the valve M' may be omitted. When coupled, the signalling valve M and the valved nozzle N cooperate for automatically unseating the valve body in the nozzle, the valve body in the signalling valve M' being also automatically seatable and unseatable Pipe P carries the nozzle N (Fig. 4), the upper portion 2 of which has a greater cross sectional diameter than its under annular delivery end. Within the chamber of the upper portion, an upstanding peripherally ported, valve guide tube 3 is fixed at 4 where the end of the nozzle forms an annular shoulder $4^a$ with the upper and larger cross sectional portion 2. Tube 3 has an annular valve seat 5 at its lower end portion which above the valve seat is provided with a series of exit ports 6. The upper open end of guide tube 3 is provided with an annular valve stop 7 fixed to the tube at 8. The open top guide tube 3 permits entrance of liquid into the cup valve 9 contained by it to weight the latter and aid in seating the valve. The upper end of the cup valve which is slidable in the guide tube is open.

The exterior diameter of tube 3 which is open at the top, is of considerably less diameter than the interior diameter of the upper portion of the nozzle; said ports 6 are large and numerous; and the interior diameter of the annular valve seat 5 is made as large as structural conditions permit,—all for the purpose of securing a free and continuous flow of liquid from pipe P into the annular chamber around the guide tube 3, through the ports 6 and out into the discharge end of the nozzle when the cup valve 9 is unseated. This cup valve 9 is so dimensioned as to be freely slidable up and down in the guide tube 3, in order to close the ports 6 when seated and to uncover them when lifted to its highest position with its bottom 10 above the ports and its upper edge arrested by the valve stop 7 of large interior diameter fixed to the upper, inward margin of guide tube 3. The cup valve, incidentally, is usually full of the liquid in the pipe and in the upper portion of the tube 3 and tends to keep the valve seated; and gravity may also act to seat the cup valve. The bottom 10 of the cup valve carries a fixed dependent pin 11 within the delivery end of nozzle N. The free end of this pin which constitutes the nozzle valve unseating pin is adapted to contact with an abutment in the intake end of the intake shut-off and signalling valve M. The delivery end of the nozzle is outwardly provided with a re-entrant bayonet recess 12 open at the free edge of the nozzle and terminating in an upper inclined end portion.

Tank A to be filled may have the shut-off and signalling valve M a fixed part of itself if preferred; but, in order that the valves M may be readily attached to existing motor car fuel tanks, the under central discharge port wall of its bottom chambered member 13 is screwed at 14 to the upper end of the usual upstanding intake tube $a$, replacing the usual closure cap. The chamber wall of member 13 is shown of considerably greater diameter than the discharge port in order to form ample space for liquid and a downwardly unseatable and upwardly seatable shut-off and signalling valve contained in the chamber. The upper and under walls of member 13 are flattened for reduction of the height of the valve as a whole. The upper wall is provided with an integral, upstanding, interiorly threaded port wall 15 into which at 16 the under end of an upstanding pipe nozzle, receiving tube 17 is fixed. A floating shut-off and a signalling valve having an upwardly seatable, beveled head 18 and a downwardly extending enlarged portion 19 is mounted in the chamber of member 13 opposedly to the discharge port and tube $a$. The valve portion 19 which may be of any desired shape and of various dimensions, is so dimensioned that a clear space is left around it between its wall and the wall of the chamber for free flow of liquid from the valve chamber into the tank.

An annular valve seat and valve-stem guide 19$^a$ having a downwardly flaring seat 20 for valve head 18 is screwed at 21 into the lower portion of the upper tube 17. The upper portion of the said guide has horizontal radial arms 22 carrying a central hub 23 which extends below and also above the arms. Above the arms, the hub is formed with diametrically opposed vertical valve-stem, guide pin slots 24 into which the free ends of a transverse guide pin 25 through the stem 26 of the float valve slidably project to keep the valve-stem from axial rocking in its bearing in the hub and also to keep the float valve from axial rocking movements. The upper marginal wall of the float valve supports a vertically slidable signal rod 28 freely movable in an upstanding, chambered extension 29 of the upper wall of member 13, at a side of the tube 17. The under end of the chambered extension is tubular and shown screwed at 30 into a hole in the chamber wall. The upper end of the extension or signal guide 29 is transversely rectangular in cross section for reception of a loose fitting, rectangular signal head 31 visibly lettered "Full" mounted on the upper end of the signal rod 28, the upper end of the rod carrying extension or signal guide 29 and which carries the lettered signal head, is indicated by 32 and forms the head of the extension or signal guide 29. When the float valve 18 is down and wide open to the limit fixed by impact of the guide pin 25 on the under end walls of slots 24, the signal head is seated in the chamber of the signal guide head 32 and invisible. The signal rises with the float valve 18 and becomes fully visible when the valve 18 is upwardly seated on the bottom end of tube 17. When the float valve seats by upward flotation entrance of liquid into tube or intaker 17 is arrested and the chamber of the latter contains but little liquid. At the same time, looseness of the signal rod practically vents the signal rod guide bore in extension 29; but as shown, a boss 28$^a$ at the foot of the signal rod 28 and fixed to the float is moved upwardly against the under end of the extension and acts as a shut-off to prevent escape of vapors, when and if so desired. Some motor car vehicle fuel tanks are made without vents to the atmosphere except through the intaker and some are not. In the present case, provision is made for escape of air or vapor from the tank while it is being filled through the small space $x'$ around the signal rod and head, between it and the inner wall of the extension or guide 17. The upper end of the latter may be covered, during travel or rest, by a cap not shown.

The upper end of hub 23 is shown covered by a screw cap 33 which forms a fixed abutment against which the nozzle valve unseating pin 11 or mouth valve covered by it contacts when the nozzle is thrust downwardly into the tube 17 and the nozzle and valve M are coupled for filling (Fig. 6).

For coupling, tube 17 is provided with a short, inclined, projecting interior coupling pin 34 which is received into the open bayonet slot 12 of the nozzle, the pipe being manually twisted slightly for that purpose on making the connection. A reverse, automatic twist of the flexible pipe P serves to seat the pin in the upper inclined portion 12ª of the bayonet slot, as the exterior nozzle shoulder 35 impinges on the upper end of tube 17.

Screw cap 35ª for tube 17 in the form shown, may be the usual cap for intaker $a$ in existing motor car fuel tanks.

Considering the coupled structure of Fig. 6, it will be seen that with the float valve 19 in the tank valve M seated and with the cup valve 9 in the nozzle N seated at the completion of a filling operation, there will be liquid, between such valves, in the under end portion of the nozzle below the valve seat 5. And that on withdrawal of the nozzle there might be a small quantity split from it. Liquid then in the intaker 17 above the seated float valve would remain therein and be covered by the cap 35 when the latter were put in place. Consequently, as an insurance against the possible spill from the nozzle end, the exterior end of the nozzle is tapered inwardly at 36 forming an upwardly and outwardly inclined valve seat 37 in which a nozzle mouth valve body 38 carried by the under end of the unseating pin 11 is seatable simultaneously with the seating valve 9. The mouth valve rises and falls with the valve 9.

Referring now to the shut-off signalling valve M' in communication at its discharge end with the intake end of pipe P and in communication at its intake end with the eduction tube $p$ of pump B, (Fig. 1) it is noted that the valve M' is of the same construction as the already described valve M, forming a member of tank A; except, however, that the cap 35 is not used and that the upper or intake threads 35ª for the screw cap serve to connect the valve M' to the eduction pipe at 39. The mode of operation of the valve M', however, involves a certain action not involved in that of the valve M. During the filling operation, with the nozzle N and valve M' coupled as shown in Fig. 6, the float valve will be seated by flotation. The signal in valve M' will have been brought into view and practically simultaneously with the rise into view of the tank signal on valve M. Due to the resistance of the liquid in the receiving tank being filled to flow of liquid through the pipe into the tank, a back pressure established in the pipe, against the face of slowed up turning movements of the crank B', will operate to seat the float valve body in the valve M', and bring its signal head into view at the pump when the operator turns the handle, observes the indicator B³ and knows when to slow down the crank movements.

The usual roadside pumps are usually some little distance from the car, the fuel tank of which is to be filled, and it is highly desirable to have a signal at the pump within easy sight of the pump operator and it is also desirable to have a signal at the car tank within sight of the fuel purchaser.

In the intake valve shown in Fig. 2, the chambered member 13 shown in Fig. 5 is omitted and the open tube 17 is fixed in an upper opening in the tank. The float valve structure 18 and 19 is dependent within the chamber of the tank, the upper portion of signal operating rod 28 being also in such chamber. The signal guiding extension 29 is fixed in the tank wall. Otherwise the two forms of this intake signalling valve are alike. In the construction of Fig. 2, the valve is reached by removing the seat cushion E and lifting off the usual lid F of the tank holding seat structure, the cap 35 being removed during the filling operation and thereafter replaced as usual.

It is sometimes desirable to make the signal guide extension 29 with a permanently closed top as indicated in Fig. 3 wherein the head 32 is provided with a glass panel 32ª through which the raised signal is visible. It is also preferred, especially where the signal extension is closed to provide a vent $Q^2$ between the nozzle and the intaker tube $a$ and this vent for the tank is conveniently formed by a notch at $Q^2$ in the under edge of the shoulder 35. The exterior diameter of the nozzle N below the shoulder 35 is less than the interior diameter of the intaker tube so that the vent $Q^2$ communicates through the venting space $q$ with the interior of the tank chamber, preferably. Also preferably, the support S for valve seat 5 in the nozzle is formed with radial arms S' carrying a central hub S² through which the spindle 11 of the valves 9 and 38 loosely plays, a coiled spring S³ being located between the hub S² and the top surface of the mouth closing valve 38. Consequently, both nozzle valves are lifted against the resistance of the spring S³. The interlock of the bayonet slot 12 and pin 34 holding the nozzle and intaker tube together against the stress of the spring during the coupled position of the nozzle and valve M. The instant the uncoupling movement is started the spring S³ begins to force the mouth closing valve 38 towards its seat. The spring S³ accelerates the closing movement of the valve and practically prevents spill when the nozzle is withdrawn from the intaker.

What I claim is:

A liquid fuel tank having in its upper wall a valve casing, a buoyant intake-port controlling valve in said casing unseatable by gravity when not buoyed up by contained liquid in said tank and seatable by rising liquid level in combination with a visually observable signalling device indicative of a filled condition of the tank; the valve casing being fixed in an opening in the upper wall of the tank and the signalling device comprising an upstanding, guiding member in communication with the chamber of the tank in combination with a member reciprocable in said guiding member and loosely mounted therein for venting the tank.

Signed at New York city in the county of New York and State of New York this 12th day of November A. D. 1923.

EDWIN LE GRAND BEERS.